Nov. 25, 1941.   V. L. BUNDSCHU   2,263,869
SAUSAGE SLITTING MACHINE
Filed July 26, 1939   2 Sheets-Sheet 1
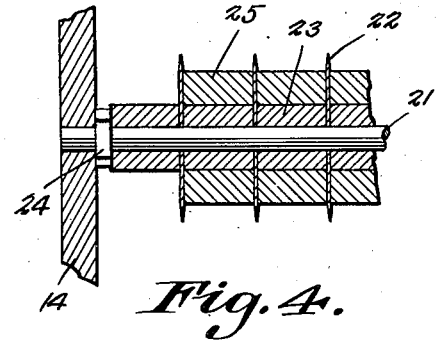
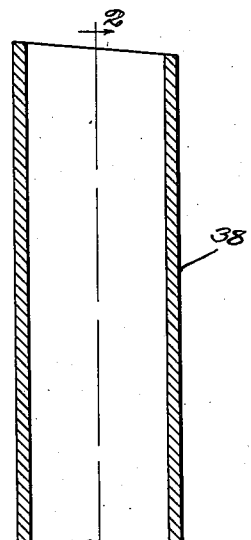
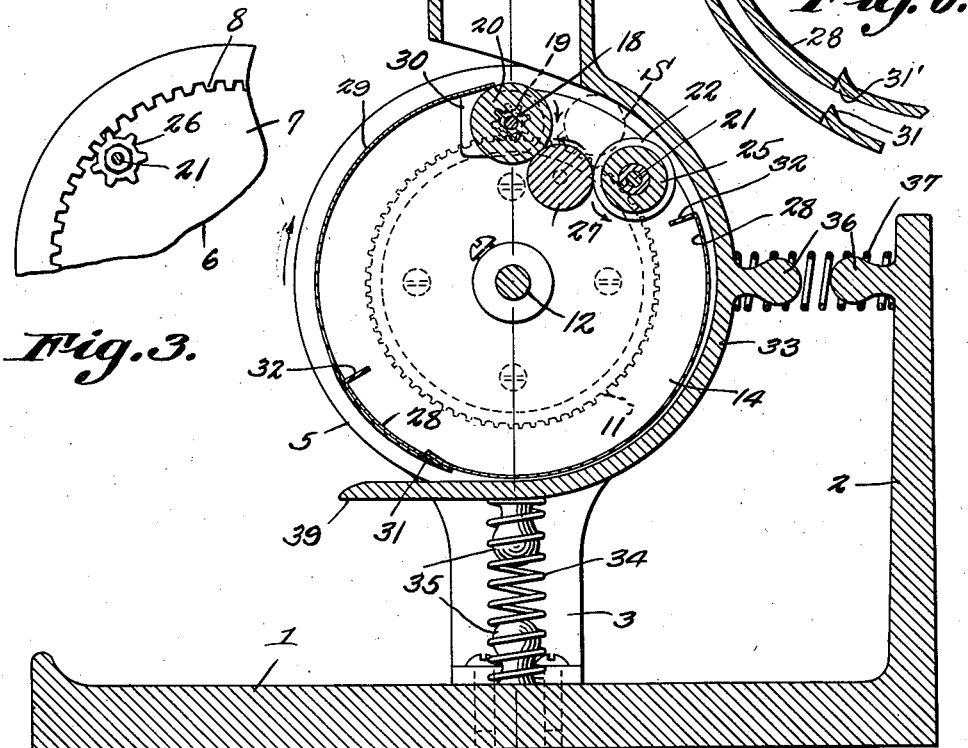
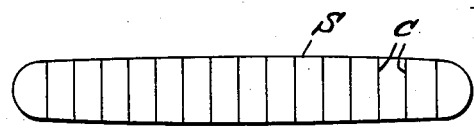
V. L. Bundschu
INVENTOR.
BY C. A. Snow & Co.
ATTORNEYS.

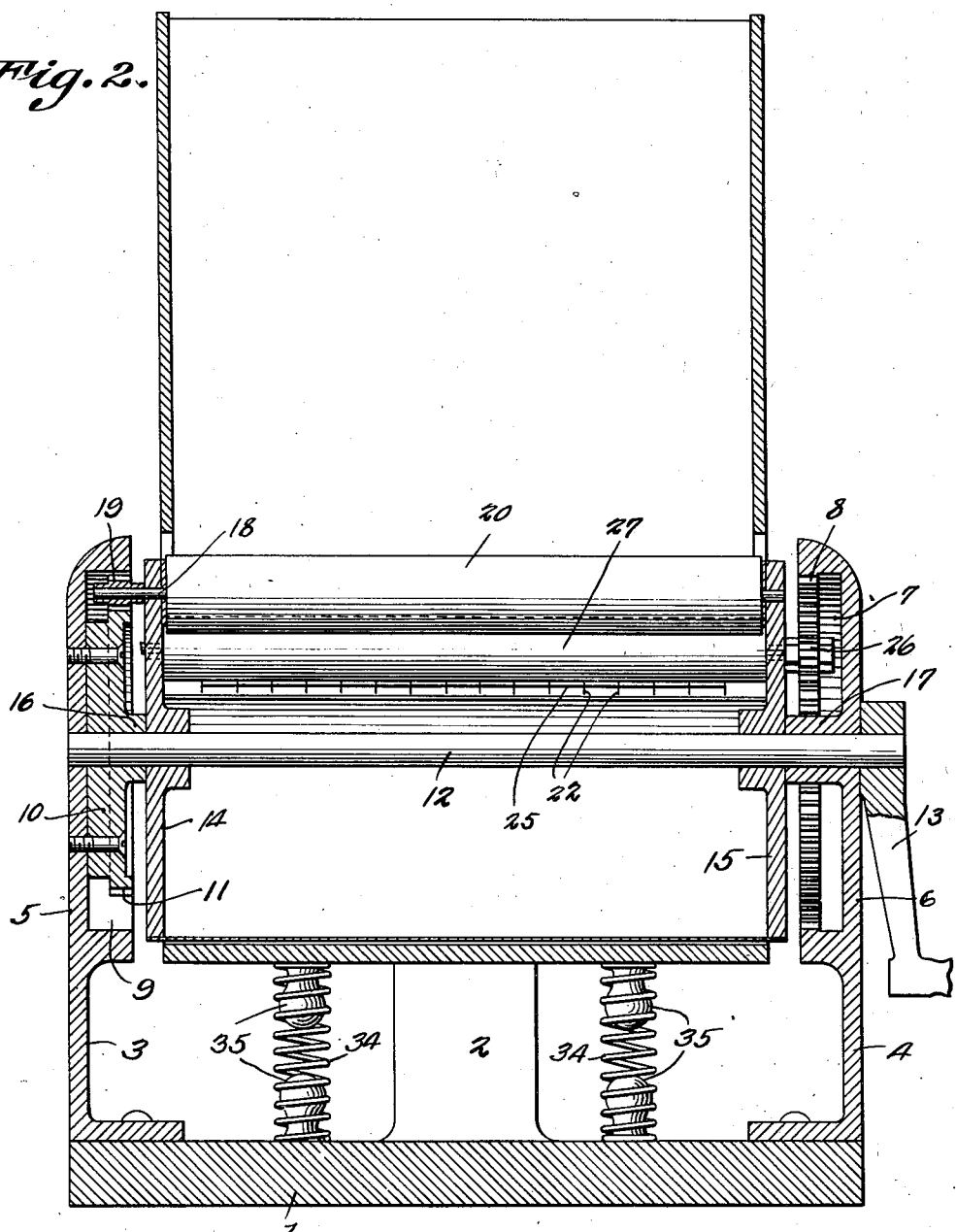

Patented Nov. 25, 1941

2,263,869

UNITED STATES PATENT OFFICE 2,263,869

SAUSAGE SLITTING MACHINE

Vincent L. Bundschu, Louisville, Ky.

Application July 26, 1939, Serial No. 286,686

17 Claims. (Cl. 17—26)

This invention relates to a machine for producing annular cuts or slits in sausages so as to produce the specially prepared product disclosed in my co-pending application covering a sausage, filed June 16, 1939, Serial No. 279,583.

An object of the invention is to provide a machine which can feed sausages in rapid succession therethrough and, during such passage, cut through the skin or jacket of each sausage so as to produce annular incisions which extend through the skin but not through the sausage.

A further object is to provide a machine of this character which is simple in construction, can be easily actuated, and which adapts itself automatically to sausages varying in diameter, or of different diameters.

Another object is to provide the machine with a traveling trough made up of rotatable members one of which includes cutting elements, these members cooperating to insure the rotation of each sausage during the cutting operation, so that the skin or jacket will be properly slit at the selected point.

Another object is to provide a machine which can be easily cleaned and will not readily get out of order.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1 is a central vertical section taken through the machine from front to rear.

Figure 2 is a section on line 2—2, Figure 1.

Figure 3 is a side elevation of a portion of the gearing in one end portion of the machine.

Figure 4 is an enlarged section through one end portion of the cutting unit.

Figure 5 is an elevation of a sausage having annular incisions such as produced by the present machine.

Figure 6 is an enlarged section through the movable ends of the drum plates, said plates being spaced apart and showing a snap-fastening means.

Referring to the figures by characters of reference, 1 designates a base having an upstanding arm 2 and mounted on the sides of the base are standards 3 and 4 carrying substantially circular heads 5 and 6 respectively. The head 6 has a recess 7 in its inner side which is circular and has an internal gear 8. Head 5 is also provided with a recess 9 and in this recess is secured a disk 10 provided with an integral gear 11.

The gears 8 and 11 are concentric with a shaft 12 which is mounted at its ends in the two heads and adapted to be rotated by any suitable means such as a crank arm 13, if the shaft is to be actuated by hand.

Secured to shaft 12 so as to rotate therewith are disks 14 and 15 which bear laterally against thrust bearings 16 and 17, the bearing 16 being extended from disk 10 while bearing 17 is extended from the head 6.

A shaft 18 is journalled in the disks 14 and 15 adjacent to the periphery thereof and projects through disk 14, the projecting end being provided with a gear 19 which is secured thereto and is in constant mesh with the gear 11. Secured to this shaft is a feed roll 20 which extends across the space between the disks 14 and 15 and has the outer portion of its periphery extended outwardly a short distance beyond the peripheries of the disks 14 and 15.

Another shaft 21 is journalled at its ends in the heads 14 and 15 and is parallel with shaft 18. On this shaft are mounted a gang of circular cutting disks 22 which are held properly spaced by interposed sleeves 23. Nuts 24 are screwed onto the shaft so as to thrust against the end sleeves 23 and thereby bind them tightly against the cutters and also to hold the cutters against rotation relative to the shaft. Each sleeve 23 constitutes a bearing for a roller 25 interposed between the adjacent cutters and extending outwardly to points adjacent to but inwardly from the edges of the cutters. These rollers are adapted to revolve freely on the spacing sleeves 23. A gear 26 is secured to one end of shaft 21 and is in constant mesh with gear 8.

The distance between the roll 20 and the cutters 22 is such as to permit a sausage to be received between these elements and the cutters and roll 20 cooperate with an idler roll 27 to form a sausage-receiving trough. This idler roll is supported for free rotation between the heads 14 and 15 and is slightly spaced from the edges of the cutters 22 so as not to dull them. It is supported close to or in contact with the roll 20.

The disks 14 and 15 are connected by an arcuate plate 28 secured to the peripheries thereof and extending from points close to the cutters 22 to points substantially diametrically opposite to the cutters. A shiftable plate 29 is mounted on the peripheries of the disks 14 and 15 and, in the structure shown, has ears 30 which are pivotally mounted on the shaft 18 at the ends of roll 20. This movable plate 29 constitutes a hinged closure and is adapted to move into and out of lapping engagement with the plate 28 to which it can be detachably connected in any suitable manner, as by means of a snap projection or fastener 31 adapted to be seated in a notch 31' in the plate 28. Plate 28 can be reenforced by inturned flanges 32 at its transverse edges.

Obviously by disengaging the two plates at the fastener 31, the closure 29 can be swung outwardly so as to expose the interior of the drum formed by disks 14 and 15 and plates 28 and 29. It is to be understood of course that the trough formed by rolls 20 and 27 and the cutters 22 opens outwardly between the peripheries of disks 14 and 15 and between plates 28 and 29.

An arcuate guide 33 extends partly around the drum from the top to the bottom thereof and is yieldingly supported by spaced springs 34 or the like interposed between the lower portion of this guide and the base 1. These can be coiled springs as shown mounted on studs 35 extending toward each other from the base and guide as shown.

Studs 36 can be extended toward each other from arm 2 and an intermediate portion of guide 33 as shown in Figure 1 and these studs can be engaged by a coiled spring 37 which serves to hold them normally spaced apart and to hold the guide 33 normally pressed close to the periphery of the drum. The upper portion of the guide 33 has a magazine 38 extending upwardly therefrom and adapted to be filled by inserting sausages into the top thereof. The bottom of this magazine is open and is adapted to register with the trough in the drum once during each rotation of the drum. The lower end of guide 33 has an extension 39 constituting a delivery apron from which treated sausages are adapted to be delivered onto the base 1 or onto a container mounted on the base.

In practice the sausages to be cut are placed in substantially horizontal positions one above the other within the magazine 38. The shaft 12 is then rotated in a clockwise direction in Figure 1 and once during each rotation the trough formed by rolls 20 and 27 and cutters 22 will be brought in position directly under the magazine 38. At that instant the lowermost sausage will drop into this trough. As the drum continues to rotate with shaft 12, gear 19 will travel around the stationary gear 11 and thus cause roll 20 to rotate in the direction indicated by the arrow in Figure 1. At the same time shaft 21 will be rotated in the direction indicated because its gear 26 travels along the internal gear 8. Consequently, during the movement of the drum as indicated, the sausage, which has been deposited in the trough and which has been indicated by broken lines at S in Figure 1, will be supported by the idler roll 27 and will cooperate with roll 20 and the inner arcuate surface of the guide 33 so as to roll downwardly along the inner surface of the guide 33 and oppositely to the direction of rotation of the cutters 22. During this rolling operation the cutters will cut through the skin or jacket of the sausage with the result that when the sausage is delivered from the extension or apron 39, it will be formed with regularly spaced annular incisions as shown at C in Figure 5.

By providing a yieldingly supported or floating guide 33, said guide will adapt itself to sausages of different diameters so that all of them will be efficiently cut while passing through the machine from the magazine to the outlet.

What is claimed is:

1. The combination with a rotatable drum, of an open trough carried by the drum and including a feed roll, an idler roll, and laterally spaced cutters, means operated by the rotation of the drum for rotating the feed roll and the cutters in opposite directions respectively, and a guide embracing the drum for closing the trough during a portion of the rotation of the drum.

2. The combination with a rotatable drum, of an open trough carried by the drum and including a feed roll, an idler roll, and laterally spaced cutters, means operated by the rotation of the drum for rotating the feed roll and the cutters in opposite directions respectively, and a yieldingly pressed floating guide embracing the drum for closing the trough during a portion of the rotation of the drum.

3. The combination with a rotatable drum, of an open trough carried by the drum and including a feed roll, an idler roll, and laterally spaced cutters, means operated by the rotation of the drum for rotating the feed roll and the cutters in opposite directions respectively, and a guide embracing the drum for closing the trough during a portion of the rotation of the drum, and means for directing sausages or the like one at a time into the trough while at one end of the guide.

4. The combination with a rotatable drum, of an open trough carried by the drum and including a feed roll, an idler roll, and laterally spaced cutters, means operated by the rotation of the drum for rotating the feed roll and the cutters in opposite directions respectively, a guide embracing the drum for closing the trough during a portion of the rotation of the drum, and means carried by the guide for feeding sausages or the like one at a time into the trough during the rotation of the drum.

5. The combination with a rotatable drum, of an open trough carried by the drum and including a feed roll, an idler roll, and laterally spaced cutters, means operated by the rotation of the drum for rotating the feed roll and the cutters in opposite directions respectively, a guide embracing the drum for closing the trough during a portion of the rotation of the drum, and means carried by the guide for feeding sausages or the like one at a time into the trough during the rotation of the drum, said feed roll and the guide cooperating to rotate a sausage within the trough and relative to the cutters during the rotation of the drum relative to the guide.

6. The combination with a drum mounted for rotation, of a trough carried by the drum and rotatable therewith, said trough including a feed roll, a series of laterally spaced rotatable cutters, and an idler roll between the feed roll and the cutters, an arcuate guide embracing a portion of the drum, means for directing a sausage into the trough, means for rotating the drum relative to the guide, and means operated by the rotation of the drum for rotating the feed roll and the cutters in opposite directions respectively, said feed roll and guide cooperating to rotate the sausage in the trough against the action of the cutters during the rotation of the drum.

7. The combination with a drum mounted for rotation, of a trough carried by the drum and comprising a feed roll, laterally spaced rotatable cutters, and an idler roll, a yieldingly supported floating arcuate guide embracing the drum and constituting a closure for the trough during a part of the rotation of the drum, means for directing a sausage into the trough, means for rotating the drum relative to the guide, and means operated by the rotation of the drum for simultaneously rotating the feed roll and the cutters in opposite directions respectively, said feed roll and the guide constituting means for effecting rotation of the sausage in the trough and relative to the cutters.

8. The combination with a rotatable drum, of a trough therein and rotatable therewith, said trough comprising a feed roll, a series of laterally spaced cutting disks, and an idler roll interposed between the disks and the feed roll, stationary gears adjacent to the ends of the drum, a gear rotatable with the feed roll and in constant mesh with one of the stationary gears, a gear rotatable with the cutting disk and in constant mesh with the other stationary gear, all of the gears cooperating to rotate the feed roll and the cutting disk in opposite directions respectively during the rotation of the drum, means for rotating the drum, and an arcuate guide embracing the drum.

9. The combination with a rotatable drum, of a trough therein and rotatable therewith, said trough comprising a feed roll, a series of laterally spaced cutting disks, and an idler roll interposed between the disks and the feed roll, stationary gears adjacent to the ends of the drum, a gear rotatable with the feed roll and in constant mesh with one of the stationary gears, a gear rotatable with the cutting disk and in constant mesh with the other stationary gear, all of the gears cooperating to rotate the feed roll and the cutting disk in opposite directions respectively during the rotation of the drum, means for rotating the drum, a yieldingly supported floating arcuate guide embracing the drum and cooperating with the feed roll to rotate a sausage in the trough oppositely to the direction of movement of the cutting disk, and means for directing sausages one at a time into the trough.

10. A machine of the class described including stationary gears, a shaft mounted for rotation relative thereto and concentric therewith, heads rotatable with the shaft, opposed arcuate fixed and movable plates connecting the heads and cooperating therewith to form a drum, means for detachably connecting the plates, said plates being spaced apart at one end, a trough positioned between the spaced ends of the plates and comprising a feed roll, laterally spaced cutting disks, and an idler roll interposed between the disks and the feed roll, said rolls and disks being supported between the heads, means cooperating with one of the gears for rotating the feed roll in one direction, means cooperating with the other gear for rotating the cutting disks in the opposite direction, and an arcuate guide embracing the drum and cooperating with the feed roll to rotate a sausage within the trough and against the direction of movement of the cutting disks during the rotation of the drum.

11. A machine of the class described including stationary gears, a shaft mounted for rotation relative thereto and concentric therewith, heads rotatable with the shaft, opposed arcuate fixed and movable plates connecting the heads and cooperating therewith to form a drum, means for detachably connecting the plates, said plates being spaced apart at one end, a trough positioned between the spaced ends of the plates and comprising a feed roll, laterally spaced cutting disks, and an idler roll interposed between the disks and the feed roll, said rolls and disks being supported between the heads, means cooperating with one of the gears for rotating the feed roll in one direction, means cooperating with the other gear for rotating the cutting disks in the opposite direction, an arcuate guide embracing the drum and cooperating with the feed roll to rotate a sausage within the trough and against the direction of movement of the cutting disks during the rotation of the drum, and a sausage magazine opening downwardly toward the drum and adapted to register with and deliver a sausage into the trough once during each rotation of the drum.

12. A machine of the class described including stationary gears, a shaft mounted for rotation relative thereto and concentric therewith, heads rotatable with the shaft, opposed arcuate fixed and movable plates connecting the heads and cooperating therewith to form a drum, means for detachably connecting the plates, said plates being spaced apart at one end, a trough positioned between the spaced ends of the plates and comprising a feed roll, laterally spaced cutting disks, and an idler roll interposed between the disks and the feed roll, said rolls and disks being supported between the heads, means cooperating with one of the gears for rotating the feed roll in one direction, means cooperating with the other gear for rotating the cutting disks in the opposite direction, a yieldingly restrained floating arcuate guide embracing the drum, and a sausage magazine carried by the guide and opening downwardly toward the drum, said magazine being positioned to deposit a sausage into the trough once during each rotation of the drum relative to the guide.

13. The combination with a drum mounted for rotation, of a gang of rotatable cutters carried thereby, said drum and gang of cutters being rotatable about separate parallel axes respectively, means for feeding a sausage into position across and against the gang of cutters and substantially parallel with the drum, and means for rotating the sausage about its longitudinal center and relative to the drum and cutters to produce a plurality of parallell annular incisions in the sausage.

14. The combination with a drum mounted for rotation, of a gang of rotatable cutters carried thereby, said drum and gang of cutters being rotatable about separate parallel axes respectively, means for feeding a sausage into position across and against the gang of cutters, said cutters constituting means for supporting the sausage substantially parallel and in contact with the drum, and cooperating fixed and movable means for rotating the sausage about its longitudinal center and relative to the drum and cutters to produce substantially parallel annular incisions in the sausage.

15. The combination with a sausage magazine, and a base, of rotatable means for supporting a sausage substantially parallel with the axes of rotation of said means and conveying the sausage from the magazine and delivering it adjacent to the base, a cutter carried by said means, said means and cutter having separate axes of rotation, and means for rotating the sausage about its longitudinal center and relative to the cutter and to the rotatable means while being conveyed to the base thereby to cut into the sausage.

16. The combination with a sausage magazine, a base, and an arcuate guide extending from the magazine toward the base, of rotatable means for conveying a sausage from the magazine, rolling it along the guide and delivering it adjacent to the base, said means comprising a trough for holding a sausage substantially parallel with the axes of rotation of said means, said trough including a gang of cutters rotatable about an axis parallell with the axis of rotation of said means, and independently rotatable rolls parallel with said axis.

17. A machine for cutting annular slits in a sausage, said machine having an inlet and an outlet, a guide leading from the inlet to the outlet, and means for rolling a sausage from the inlet to the outlet, said means including a gang of rotatable cutters, means cooperating with the cutters to form a sausage-receiving trough, and means for moving the trough along a path substantially parallel with the guide.

VINCENT L. BUNDSCHU.